(12) United States Patent
Wang

(10) Patent No.: US 8,286,317 B2
(45) Date of Patent: *Oct. 16, 2012

(54) CLUTCHING JIG

(75) Inventor: Chin-Chou Wang, Tu-Cheng (TW)

(73) Assignee: Cheng Uei Precision Industry Co., Ltd., Tu-Cheng, Taipei Hsien (TW)

( * ) Notice: Subject to any disclaimer, the term of this patent is extended or adjusted under 35 U.S.C. 154(b) by 399 days.

This patent is subject to a terminal disclaimer.

(21) Appl. No.: 12/688,911

(22) Filed: Jan. 17, 2010

(65) Prior Publication Data
US 2011/0173790 A1 Jul. 21, 2011

(51) Int. Cl.
*B23Q 1/00* (2006.01)
(52) U.S. Cl. ............................................. 29/283; 29/263
(58) Field of Classification Search .................... 29/283, 29/263, 269, 285
See application file for complete search history.

(56) References Cited

U.S. PATENT DOCUMENTS

| | | | | |
|---|---|---|---|---|
| 1,123,513 A * | 1/1915 | Gaillard | ........................... | 29/261 |
| 1,608,320 A * | 11/1926 | Karseboom | .................... | 269/140 |
| 3,962,771 A * | 6/1976 | Lines | ............................... | 29/283 |
| 4,210,990 A * | 7/1980 | Krieger | ............................ | 29/263 |
| 4,398,706 A * | 8/1983 | Kaulfuss | ........................... | 269/88 |
| 2011/0148129 A1* | 6/2011 | Wang | ............................ | 294/86.4 |

\* cited by examiner

*Primary Examiner* — Basil Katcheves
(74) *Attorney, Agent, or Firm* — Cheng-Ju Chiang

(57) ABSTRACT

A clutching jig adapted for separating a lens component from a lens socket. The clutching jig has a main body, two protecting blocks and two clutching arms. Each of the clutching arms has a fixing plate and a holding portion connected with the fixing plate. Two opposite sides of the holding portion extend perpendicularly to form a pair of opposite stabilizing wings. The clutching arms are mounted on the main body by the fixing plates thereof fixed on two opposite sides of the main body. The holding portions face to and space away from each other under the main body. The two protecting blocks are made from resilient material and respectively adhered on two inner sides of the holding portions. A receiving space is formed among the protecting blocks and the two pairs of the stabilizing wings.

5 Claims, 5 Drawing Sheets

CLUTCHING JIG

BACKGROUND OF THE INVENTION

1. Field of the Invention

The invention relates to a clutching jig, and more particularly to a clutching jig for conveniently separating a lens component from a lens socket.

2. The Related Art

Please refer to FIG. 3 and FIG. 5, a lens module includes a lens socket 7 and a lens component 6 mounted into the lens socket 7. A conventional clutching jig 8 for disengaging the lens component 6 from the lens socket 7 has a top base 81. Two opposite sides of the top base 81 extend perpendicularly downwards to form a pair of lateral plates 82. Each of the lateral plates 82 has a middle portion punched as a notch 83, with two positioning arms 84 synchronously formed at two sides thereof. Each of the notches 83 has a top side connected with a clutching arm 85, spacing away from the two positioning arms 84. When the lens component 6 is received in the space which is formed among the two pairs of the positioning arms 84, the clutching arms 85 are urged to approach each other to clutch two opposite sides of the lens component 6 and pull the lens component 6 upwardly, which makes the lens component 6 be released from the lens socket 7. However, the lens component 6 will be apt to be scratched by the clutching arms 85 and the positioning arms 84 of the conventional clutching jig 8 and damage the lens component 6. Therefore, it is desirable to design a clutching jig which has a simple structure and is capable of solving the problem mentioned above.

SUMMARY OF THE INVENTION

An object of the present invention is to provide a clutching jig adapted for separating a lens component from a lens socket. The clutching jig has a main body, two protecting blocks and two clutching arms. Each of the clutching arms has a fixing plate and a holding portion connected with the fixing plate. Two opposite sides of the holding portion extend perpendicularly to form a pair of opposite stabilizing wings. The clutching arms are mounted on the main body by the fixing plates thereof fixed on two opposite sides of the main body. The holding portions face to and space away from each other under the main body. The two protecting blocks are made from resilient material and respectively adhered on two inner sides of the holding portions. A receiving space is formed among the protecting blocks and the two pairs of the stabilizing wings. The stabilizing wings lean against two opposite sides of the lens component and the protecting blocks are attached on the other two opposite sides of the lens component, when the lens component is partly received in the receiving space and the clutching arms are urged to approach each other and pulled upwardly to separate the lens component from the lens socket.

As described above, the protecting blocks can be attached on the two opposite sides of the lens component in progress of disengaging the lens component from the lens socket, which prevents the lens component from being scratched by the clutching jig to keep the lens component intact. So the clutching jig with a simple structure is excellent and can be used widely.

BRIEF DESCRIPTION OF THE DRAWINGS

The present invention will be apparent to those skilled in the art by reading the following description of an embodiment thereof, with reference to the attached drawings, in which.

DETAILED DESCRIPTION OF THE PREFERRED EMBODIMENT

Figure 1:
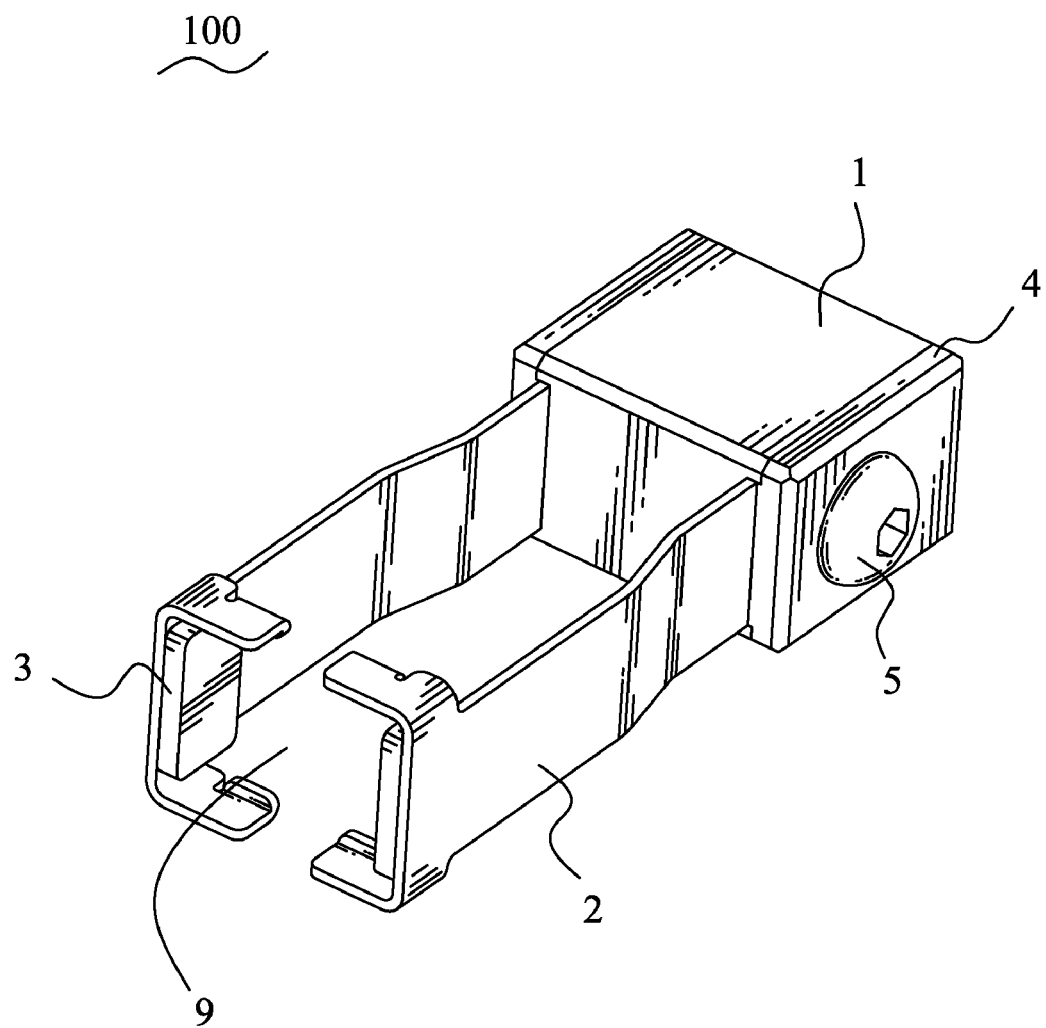
FIG. 1 is a perspective view of a clutching jig according to the present invention.
Figure 2:
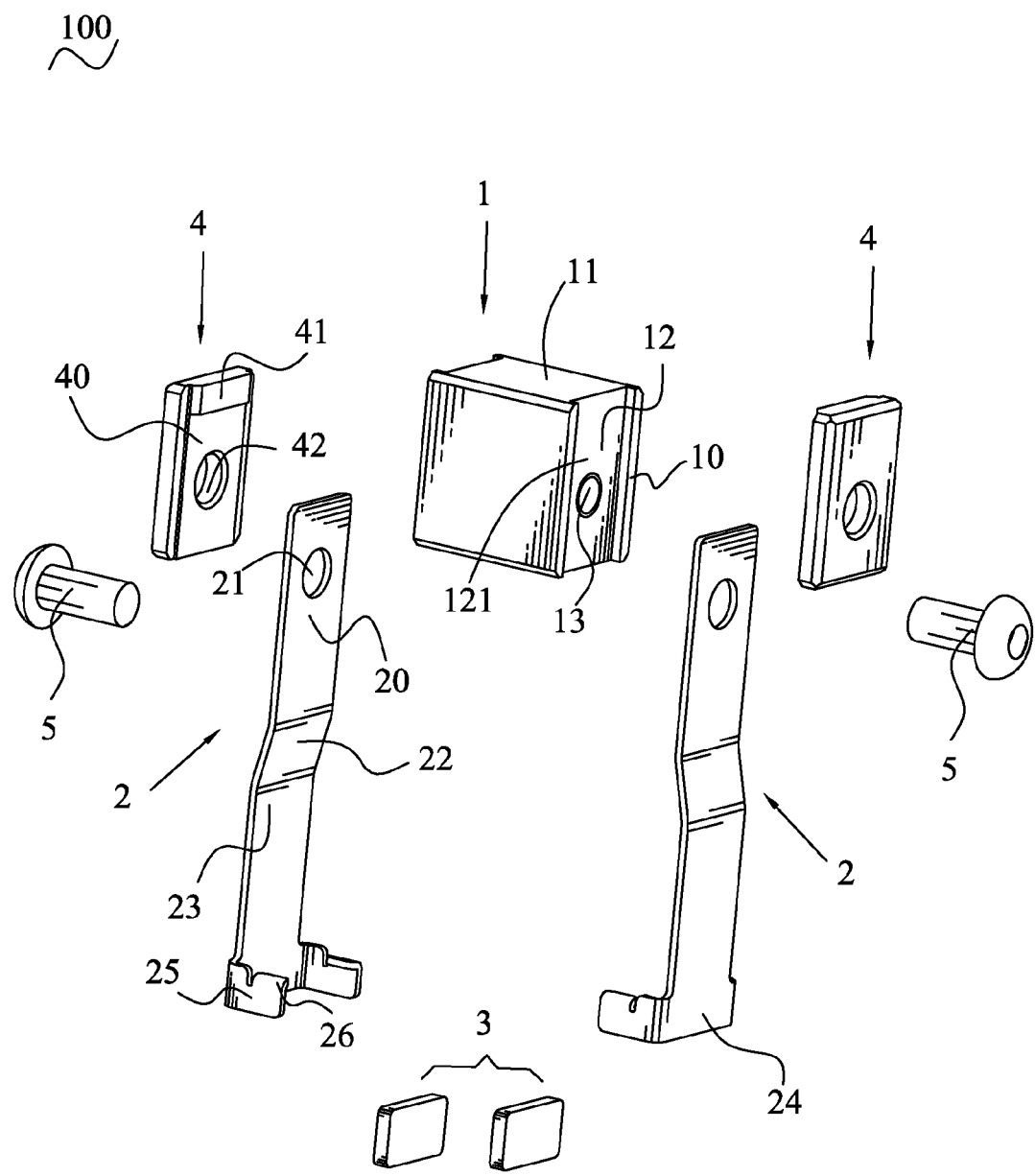
FIG. 2 is an exploded view of the clutching jig shown in FIG. 1.
Figure 3:
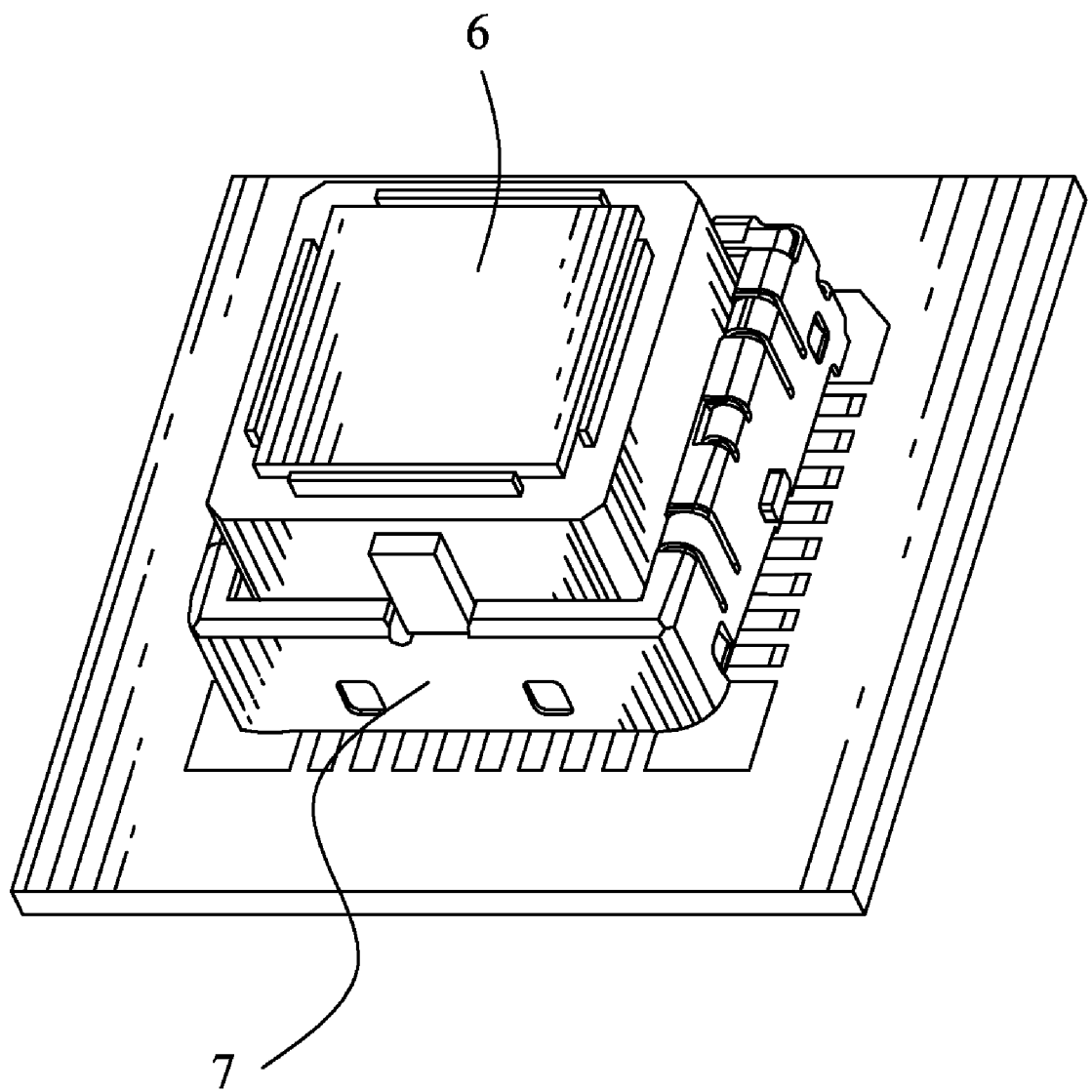
FIG. 3 is a perspective view of a conventional lens module.

Please refer to FIG. 1 and FIG. 2, a clutching jig 100 according to the present invention is shown. The clutching jig 100 includes a main body 1, a pair of clutching arms 2 mounted to the main body 1, two protecting blocks 3, a couple of fixing blocks 4 and two screws 5.

Please refer to FIG. 2, the main body 1 is a rectangular block shape and defines a top surface 11 and two opposite lateral surfaces 10 perpendicularly contiguous to two opposite sides of the top surface 11 respectively. Each of the lateral surfaces 10 is formed with a rectangular fixing recess 12 reaching the top surface 11 and the bottom surface of the main body 1. Each fixing recess 12 defines a mating surface 121. Each of the mating surfaces 121 has a portion formed with a positioning hole 13.

The two clutching arms 2 are the same in structures, here just taking one to describe. The clutching arm 2 has a rectangular fixing plate 20 received in the fixing recess 12 of the main body 1. The fixing plate 20 is formed with a fixing hole 21 passing therethrough corresponding to the positioning hole 13 of the fixing recess 12. A bottom end of the fixing plate 20 extends downwards and inclines outwards to form a connecting portion 22. The connecting portion 22 has a bottom end extended uprightly downwards to form a rectangular extending portion 23. A bottom of the extending portion 23 extends perpendicularly to form a rectangular holding portion 24 by a middle portion of a long side thereof to form as a T-shape. The holding portion 24 has two opposite stabilizing wings 25. The stabilizing wings 25 are extended perpendicularly from two opposite sides of the holding portion 24. Two spaced abutting slices 26 are extended perpendicularly towards each other from portions of top edges of the stabilizing wings 25 away from the holding portions 24.

The two protecting blocks 3 are respectively fixed on two inner sides of the holding portions 24. The protecting blocks 3 are made from resilient material. In this embodiment, the antic-static rubber is chosen as the resilient material. The adhesion of the protecting block 3 is fine and capable of making firm contact without slipping.

Each of the fixing blocks 4 is a rectangular shape and has an inner surface 40. The fixing plate 20 is sandwiched between the inner surface 40 and the mating surface 121 of the main body 1, in assembly. The inner surface 40 has a stopping rib 41 protruded inwards from an upper side thereof for abutting against a top end of the fixing plate 20, and an inserting hole 42 corresponding to the fixing hole 21 of the fixing plate 20.

With reference to FIGS. 1-2, in assembly, the two protecting blocks 3 are adhered on the respective inner sides of the holding portions 24, the two fixing plats 20 of the clutching arms 2 are received in the respective fixing recesses 12 of the main body 1, with the top ends thereof resting against the stopping ribs 41 of the fixing blocks 4 coupled with the two lateral surfaces 10 of the main body 1. The screws 5 pass through the respective inserting holes 42, the fixing holes 21 and the positioning holes 13 to make the clutching arms 2 and the fixing blocks 4 be symmetrically mounted on the main body 1. The corresponding connecting portions 22, the extending portions 23, the holding portions 24 and the stabilizing wings 26 of the two clutching arms 2 face to and space away from each other under the main body 1. A receiving space 9 for receiving the lens component 6 therein is defined among the two protecting blocks 3 adhered on the holding portions 24 and the two pairs of the stabilizing wings 26, after assembly.

Figure 4:
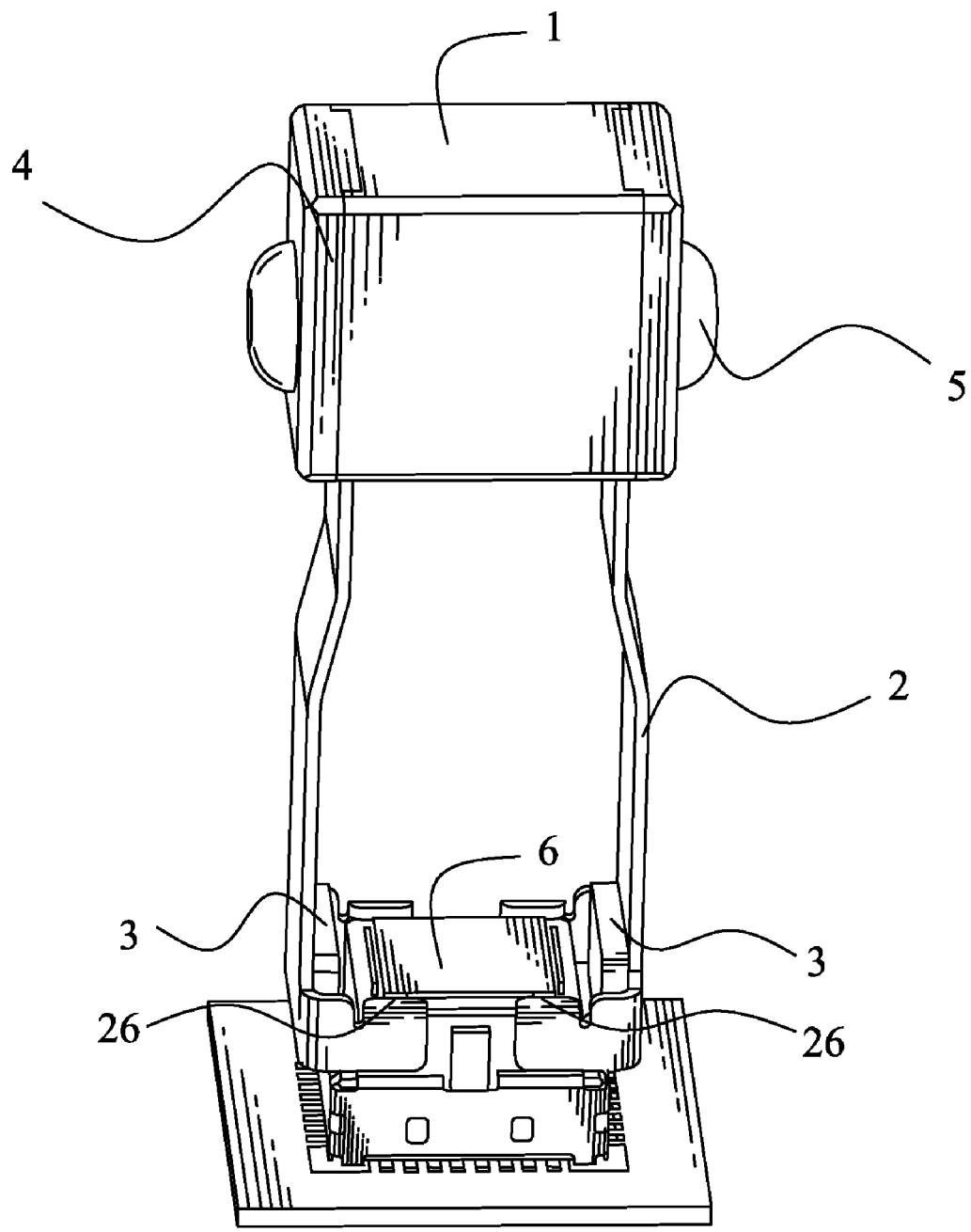
FIG. 4 is a perspective view showing a state that a lens component of the lens module shown in FIG. 3 is clutched by the clutching jig shown in FIG. 1.
Figure 5:
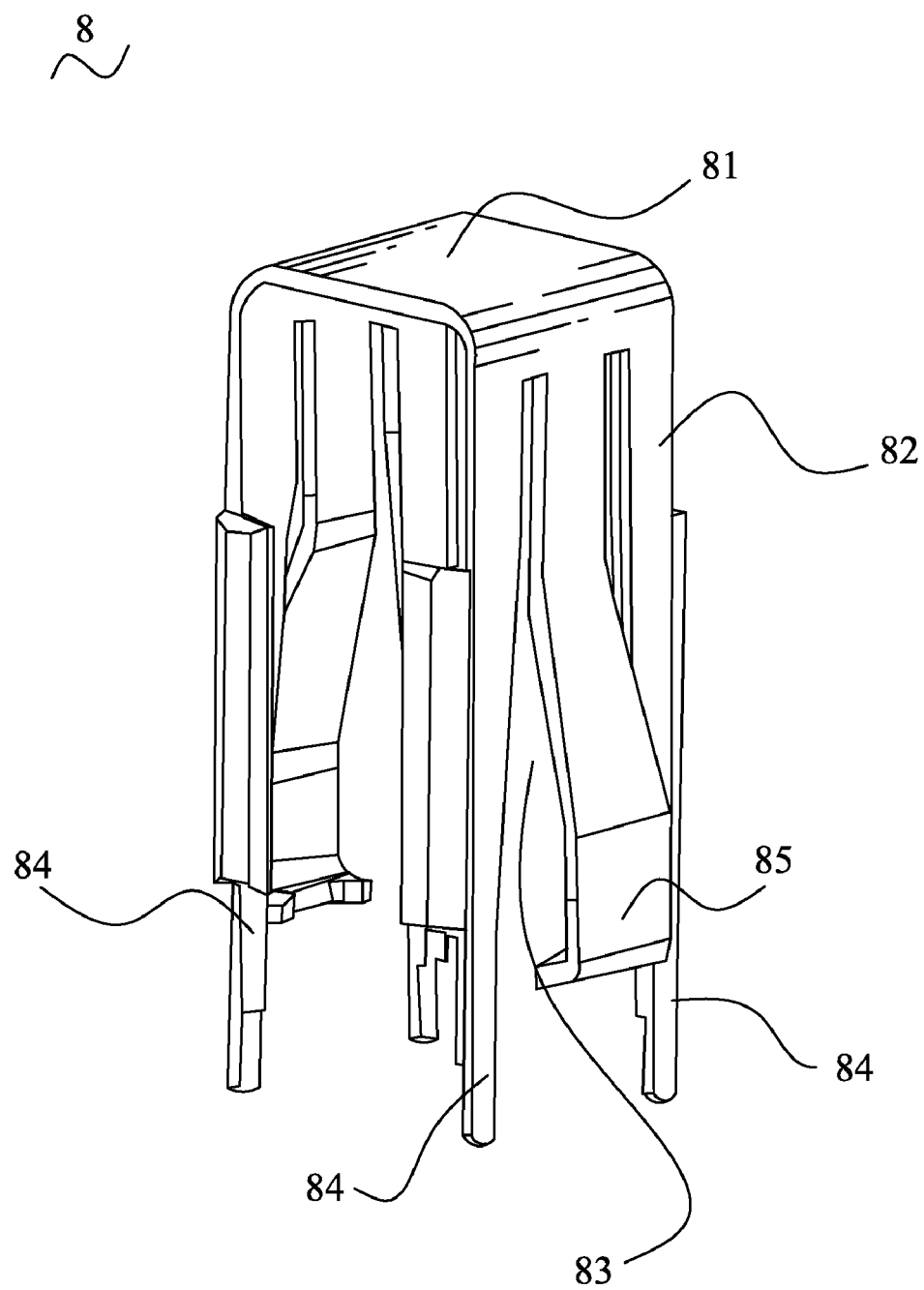
FIG. 5 is a perspective view of a conventional clutching jig.

Referring to FIG. 4, in use, when the lens component 6 is partly received in the receiving space 9 of the clutching jig 100, the stabilizing wings 25 lean against two opposite sides of the lens component 6, and the abutting slices 26 abut on a periphery of a top of the lens component 6. The clutching arms 2 are gripped to approach each other to make the protecting blocks 3 be attached on other two opposite sides of the lens component 6, respectively. At this time, as the clutching jig 100 is pulled upwardly with the lens component 6, the lens component 6 is released from the lens socket 7.

As describe above, the protecting blocks 3 can be attached on the two opposite sides of the lens component 6 in progress of disengaging the lens component 6 from the lens socket 7, which prevents the lens component 6 from being scratched by the clutching jig 100 to keep the lens component 6 intact. So the clutching jig 100 with a simple structure is excellent and can be used widely.

Furthermore, the present invention is not limited to the embodiment described above; various additions, alterations and the like may be made within the scope of the present invention by a person skilled in the art. For example, respective embodiments may be appropriately combined.

What is claimed is:

1. A clutching jig adapted for separating a lens component from a lens socket, comprising:
   a main body;
   two protecting blocks;
   two clutching arms, each of the clutching arms having a fixing plate and a holding portion connected with the fixing plate, two opposite sides of the holding portion extending perpendicularly to form a pair of opposite stabilizing wings; and
   a pair of fixing blocks disposed at the two opposite sides of the main body, each of the fixing plates being sandwiched between the corresponding fixing block and main body;
   wherein the clutching arms are mounted on the main body by the fixing plates thereof fixed on two opposite sides of the main body, the holding portions face to and space away from each other under the main body, the two protecting blocks are made from resilient material and respectively adhered on two inner sides of the holding portions, a receiving space is formed among the protecting blocks and the two pairs of the stabilizing wings, the stabilizing wings lean against two opposite sides of the lens component and the protecting blocks are attached on the other two opposite sides of the lens component, when the lens component is partly received in the receiving space and the clutching arms are urged to approach each other and pulled upwardly to separate the lens component from the lens socket, the main body, the fixing plates and the fixing blocks are formed with positioning holes, fixing holes and inserting holes, respectively, and two screws are provided for passing through the respective positioning holes, the fixing holes and the inserting holes to fix the fixing plates, the fixing blocks and the main body together.

2. The clutching jig as claimed in claim 1, wherein the fixing block has a stopping rib at an upper portion of a side thereof for retraining against a top end of the fixing plate.

3. The clutching jig as claimed in claim 1, wherein portions of upper sides of the opposite stabilizing wings are extended towards each other to form a pair of abutting slices for abutting on a periphery of a top of the lens component.

4. A clutching jig adapted for separating a lens component from a lens socket, comprising:
   a main body;
   two protecting blocks; and
   two clutching arms, each of the clutching arms having a fixing plate and a holding portion connected with the fixing plate, two opposite sides of the holding portion extending perpendicularly to form a pair of opposite stabilizing wings;
   wherein the clutching arms are mounted on the main body by the fixing plates thereof fixed on two opposite sides of the main body, the holding portions face to and space away from each other under the main body, the two protecting blocks are made from resilient material and respectively adhered on two inner sides of the holding portions, a receiving space is formed among the protecting blocks and the two pairs of the stabilizing wings, the stabilizing wings lean against two opposite sides of the lens component and the protecting blocks are attached on the other two opposite sides of the lens component, when the lens component is partly received in the receiving space and the clutching arms are urged to approach each other and pulled upwardly to separate the lens component from the lens socket, each of the fixing plates has a bottom end extended downwards and inclined outwards to form a connecting portion, a bottom end of the connecting portion is extended downwards to form an extending portion, a bottom of the extending portion extends perpendicularly to form a rectangular holding portion by a middle portion of a long side thereof to form as a T-shape.

5. The clutching jig as claimed in claim 4, wherein portions of upper sides of the opposite stabilizing wings are extended towards each other to form a pair of abutting slices for abutting on a periphery of a top of the lens component.

* * * * *